United States Patent [19]

Krogsrud

[11] 4,435,817
[45] Mar. 6, 1984

[54] CONTACT ASSEMBLY

[75] Inventor: Harald Krogsrud, Gjettum, Norway

[73] Assignee: Elkem a/s, Oslo, Norway

[21] Appl. No.: 281,689

[22] Filed: Jul. 9, 1981

[30] Foreign Application Priority Data

Jul. 25, 1980 [NO] Norway ............................. 802266

[51] Int. Cl.³ ............................................ H05B 7/11
[52] U.S. Cl. ................................. 373/103; 174/94 S;
403/5; 403/31
[58] Field of Search .............. 339/117 P; 373/95, 103,
373/101; 174/94 S, 21 JS; 403/5, 31

[56] References Cited
U.S. PATENT DOCUMENTS 3,362,733 1/1968 Klara ..................................... 403/31

FOREIGN PATENT DOCUMENTS 1132160 3/1957 France .................................. 403/5
696197 11/1979 U.S.S.R. ............................... 403/5

Primary Examiner—Roy Envall, Jr.
Attorney, Agent, or Firm—Eyre, Mann, Lucas & Just

[57] ABSTRACT

The disclosed invention is an apparatus for connecting two current conducting tubes, which also conduct fluids such as for example, a coolant. The connection apparatus conducts current from one tube to the other through a sleeve, the said tubes having a machined external surface against which the sleeve is pressed. A hose receiving hydraulic pressure is disposed between the sleeve and an external casing for providing a removable pressure against the sleeve for clamping the pipes in the sleeve. The present invention may be used in conjunction with a holder assembly for electrodes in an electrothermal smelting furnace.

8 Claims, 3 Drawing Figures

CONTACT ASSEMBLY

The present invention relates to apparatus for interconnecting two tubes for conducting electrical current, the tubes also serving as conduits for circulating a fluid such as, for instance, a coolant. The connecting apparatus is of a type which conducts current from one tube to another through a contact means, said tubes having suitable surfaces against which the contact means is pressed. More particularly, but not exclusively, the present invention relates to a connecting apparatus used in conjunction with a holder assembly for electrodes in an electrothermal smelting furnace such as for example furnaces for smelting ferro alloys, pig iron and/or carbide.

Connecting apparatus of this type requires a design which provides excellent electrical contact between those elements which are to be connected. Further such a connection should be as simple and rigid as possible, while providing a connection which easily may be engaged or disengaged. Further, such a connection requires liquid tight sealing in order to prevent the coolant from leaking out of the interconnection. Joining of current conducting copper pipes is usually achieved by means of silver soldering and use of a muff body or a jacket into which the tube ends to be joined are introduced. Alternatively a split socket or sleeve is applied and clamping is provided by means of bolts, nuts or similar devices clamping the sleeve around the ends to be joined. For joints of this type the ends to be joined have to be completely free from films of oxide, oil, dirt etc.

If any component or the entire holder assembly is to be replaced, there presently is a relatively long downtime for repair of the smelting furnace.

According to the present invention apparatus is provided wherein the contact means comprises a thrust body to aid in creation of an adjustable and removable contact pressure between the contact clamps and the tube ends to be interconnected. Said contact pressure is sufficient to provide excellent electrical contact.

The contact means comprises preferably a formed ring or cylinder member which is subjected to an external radial and/or circumferential pressure from a pressure producing means. The ring member surrounds the two ends of the tubes. The ring member is preferably in the form of a sleeve of copper or similar material which, when a pressure is supplied to the pressure producing means, is pressed against the tube ends. The internal surface of the sleeve may be machined and preferably polished. Additionally, the corresponding surface on the tube ends should be correspondingly machined and preferably polished.

According to one preferred embodiment of the present invention the sleeve is preferably split, the split being preferably of a helical shape to produce sufficient elasticity to provide an even clamping effect on the tube end. The pressure producing means may for example consist of a flexible hose of rubber or similar material which may be subjected to an internal pressure by means of a hydraulic medium. The hose may preferably surround the sleeve. Externally around the flexible hose, a steel cylinder preferably made of stainless steel is arranged. The stainless steel cylinder serves as a thrust member for the hoses as they impose a pressure on the sleeve.

One end of the stainless steel cylinder may be welded to one of the tubes, preferably, by means of a non-magnetic disc of stainless steel, the disc being fixed to the copper pipe by means of brazing. Said disc may preferably be arranged in such a way that the machined portion of the pipe end is flush with the corresponding area of the disc. As previously pointed out the tube ends to be in contact with the contact means are machined in order to provide sufficient contact area between the sleeve and the pipe ends.

One preferred embodiment of the present invention will now be described in further detail in conjunction with the figures, wherein.

Figure 1:
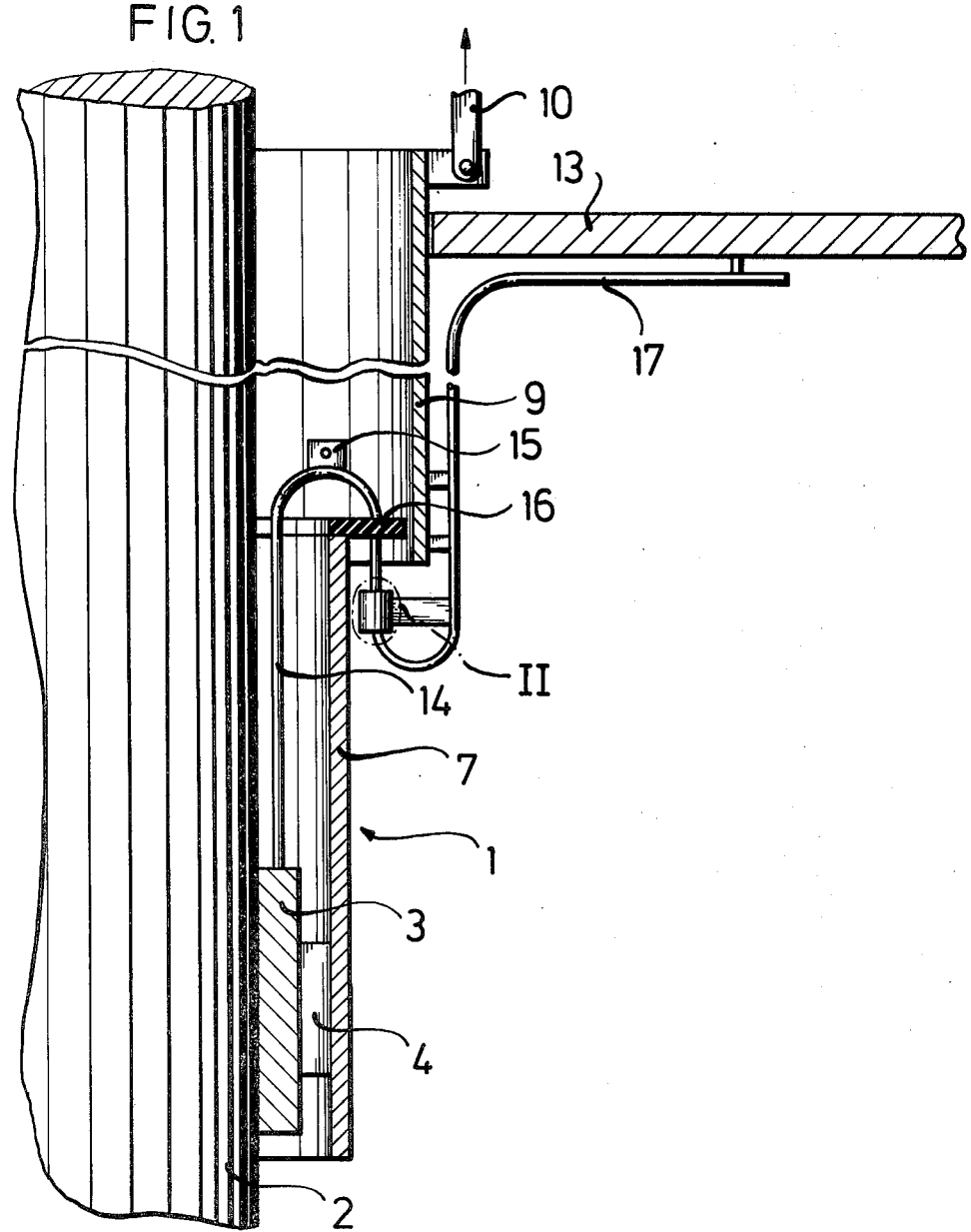
FIG. 1 shows a vertical section through one half of an electrode with a holder assembly in accordance with the present invention.

FIG. 1 shows a vertical section through one half of an electrode 2 provided with an electrode holder assembly 1. The electrode holder assembly 1 is made as an integral unit where current, coolant and pressure agent are conducted through the same supply line. The supply lines also serve as suspension means for the holder assembly 1 and consequently the electrode 2.

The holder assembly 1 comprises a plurality of contact clamps 3 which completely surround the electrode 2. The contact clamps 3 are provided with pressure producing means 4. These may be of any known type. Externally, a cooling shield, preferably in the form of a complete, undivided body, surrounds the electrode 2 and clamps 3. The pressure producing means 4 thrust the contact clamps 3 towards the circumference of the electrode 2, the externally arranged cooling shield 7 serving as thrust member for the pressure producing means 4. The cooling shield 7 must have sufficient dimensions and strength to resist these thrust forces. The cooling shield 7 may alterntively be made up of separate sections which are interconnected to form a single, rigid structure.

According to the embodiment shown on FIG. 1, the supply lines are made of pairs of current conducting tubes or pipes, for example, made of copper. The pipes are preferably welded on to the contact clamps 3 to form an integral unit with the contact clamps. The contact clamps 3 including pressure producing means 4 are suspended by means of the pipes 14, which rest on corresponding pipes 17, supported by a suspension casing 9. The corresponding tubes are rigidly fixed to the casing by means of brackets. In order to provide a liquid tight connection between the pipe ends 14 and 17 a connection apparatus according to the present invention is used. This apparatus will be described in further detail in conjunction with FIGS. 2 and 3. The cooling shield 7 is supported by the tubes 14 by suitable supporting means (not shown). The suspension casing 9 is suspended by means of struts, ties etc. and an electrode winch (not shown).

The contact clamps 3 with its pressure producing means 4 and the cooling shield 7 have together a total external diameter which is less than the internal diameter of the suspension casing 9. Consequently the entire holder assembly may be lifted up or lowered down as a single unit through the suspension casing 9 without having to remove or rebuild any of the components of the holder assembly. In order to make such lifting possible, the tubes 14 are equipped with pad eyes 15 welded on to the tubes 14.

At its upper end the cooling shield 7 is equipped with a gas tight sealing 16, arranged between the cooling shield 7 and the electrode 2.

Figure 2:
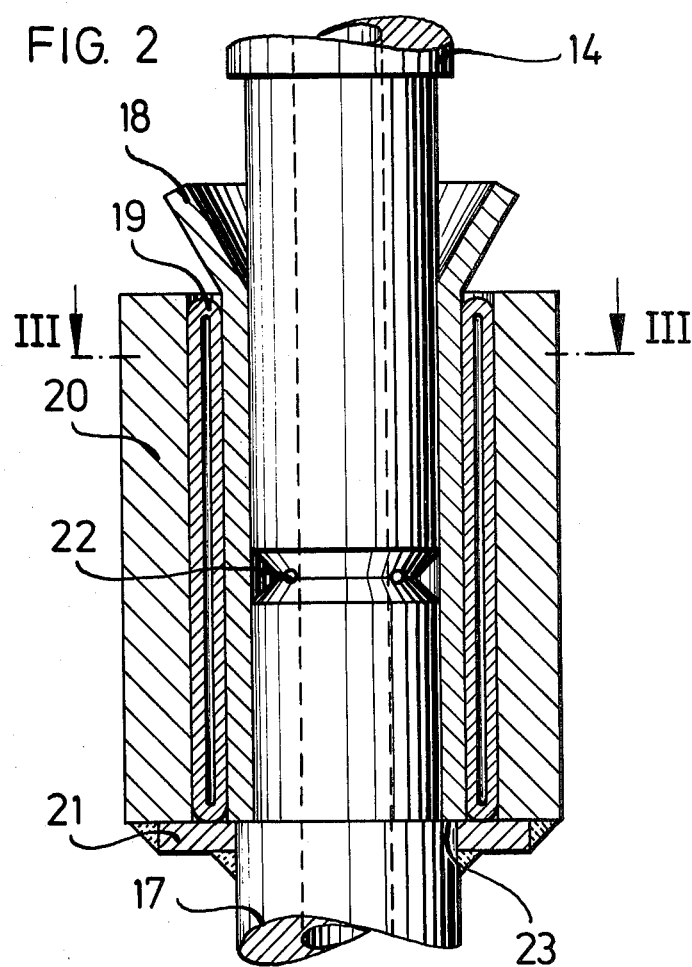
FIG. 2 shows a vertical section through one embodiment of the connection means.
Figure 3:
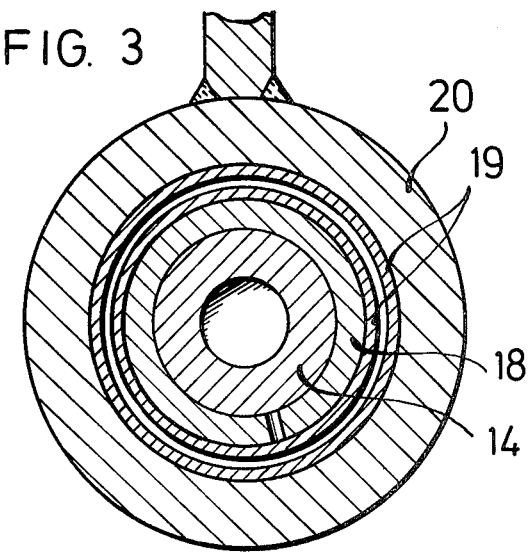
FIG. 3 shows a horizontal section through the connection means shown on FIG. 2, seen along line III—III on FIG. 2.

FIG. 2 shows a vertical section through a connecting device according to the present invention, indicated as detail II on FIG. 1. The figure shows a vertical section through the contact means, showing the ends of the two pipes 14, 17. As shown on FIG. 2 the connecting device comprises a cylindrical sleeve 18 which surrounds the ends of the two pipes to be interconnected. At its upper end the sleeve 18 has an enlarged entrance portion in order to enabling centering of the pipe 14 when introduced into the sleeve 18. The inner surface of the sleeve 18 is preferably machined. Further, the external surface of the pipe ends 14 and 17 are machined. In order to provide as proper electrical contact between the surfaces as possible, the surfaces are preferably polished. Further, as best seen in FIG. 3, which is a section taken along line III—III of FIG. 2 the sleeve 18 is split in vertical direction by at least one slit. The purpose of the slit of the sleeve 18 is to improve the elasticity of the sleeve whereby the sleeve, when exposed to external pressure, provides sufficient clamping contact between the tube ends. A cylindrical shaped hose body 19 surrounds the sleeve 18. The host receives an internal pressure from a pressure producing source (not shown). In order to provide sufficient thrust, a cylindrical ring body 20 is arranged externally around the hose. At its lower end the ring body is welded on to radial disc 21 affixed the tube 17. The upper surface of the disc 21 is flush with the lower end of the machined surface of the tube end 17. In order to provide hydrauic tightening between the two tube ends, a sealing ring 22, for example made of rubber or similar material, is arranged between the two tube ends.

I claim:

1. In combination with an electrode holder assembly in which contact clamps are suspended by electrically-conducting pipes which are also adapted for transport of fluid therethrough; connection means for joining corresponding ends of said electrically-conducting pipes for continuity of electrical current conduction and fluid transport therethrough, said connection means comprising a sleeve of electrically-conductive material, said sleeve being adapted for receiving at each end thereof end portions of pipes to be joined; a hydraulically activated cylindrical hose surrounding said sleeve; and an external casing disposed around said cylindrical hose.

2. The apparatus of claim 1 wherein one pipe is rigidly affixed in said sleeve and the end of said sleeve opposite said rigidly affixed pipe includes means for centering the end portion of the other pipe.

3. The apparatus of claim 1 wherein the inner surface of the sleeve and the end portions of said pipe are operative to provide large surface area contact between the sleeve and the end portions.

4. The apparatus of claim 1 wherein the sleeve has at least one axial slit.

5. The apparatus of claim 1 wherein the sleeve has at least one helical slit.

6. The apparatus of claim 1 further comprising a sealing means disposed at the ends of said two pipes while they are received in said sleeve.

7. In combination with an electrode holder assembly having contact clamps which includes pairs of electrically-conducting pipes which are also adapted for transport of fluid therethrough, at least one said pair of pipes:
   (a) having a first pipe connected to the electrode holder, said one pipe terminating in an upward direction;
   (b) having a second pipe connected to at least one contact clamp, the end of said second pipe remote from said contact clamp terminating in a downward direction;
   (c) a connector affixed to said one pipe and operative to receive said second pipe, said connector comprising:
      (i) a sleeve of electrically-conductive material, said sleeve having a slit along its length;
      (ii) a hydraulically activable cylindrical hose surrounding said sleeve; and
      (iii) an external casing around said cylindrical hose;
   (d) being connected in fluid-tight relationship.

8. The apparatus of claim 7 wherein said casing is also rigidly affixed to said one pipe.

* * * * *